United States Patent
Persson et al.

(10) Patent No.: US 11,932,099 B2
(45) Date of Patent: Mar. 19, 2024

(54) METHOD FOR MOUNTING A BATTERY SYSTEM TO A CHASSIS OF AN ELECTRIC VEHICLE

(71) Applicant: Volvo Car Corporation, Gothenburg (SE)

(72) Inventors: Klas Persson, Kungälv (SE); Simone Vizzini, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 212 days.

(21) Appl. No.: 17/536,362

(22) Filed: Nov. 29, 2021

(65) Prior Publication Data
US 2022/0176788 A1   Jun. 9, 2022

(30) Foreign Application Priority Data

Dec. 9, 2020   (EP) .................................... 20212690

(51) Int. Cl.
*B60K 1/04* (2019.01)
*H01M 50/204* (2021.01)
(Continued)

(52) U.S. Cl.
CPC ............. *B60K 1/04* (2013.01); *H01M 50/204* (2021.01); *H01M 50/264* (2021.01);
(Continued)

(58) Field of Classification Search
CPC ............ B60K 1/04; B60K 2001/0438; H01M 50/204; H01M 50/264; H01M 50/24; H01M 2220/20
See application file for complete search history.

(56) References Cited

U.S. PATENT DOCUMENTS

2006/0278617 A1* 12/2006 Anantharaman ............................
B29C 66/53461
228/179.1
2012/0111654 A1   5/2012 Origuchi
(Continued)

FOREIGN PATENT DOCUMENTS

| DE | 102018110481 B3 | 3/2019 | |
| DE | 202019104441 U1 | 11/2020 | |
| DE | 202019104441 U1 * | 12/2020 | ............... B60K 1/04 |

OTHER PUBLICATIONS

Mar. 18, 2021 European Search Report issued in International Application No. 20212690.

*Primary Examiner* — Jason D Shanske
*Assistant Examiner* — James J Triggs
(74) *Attorney, Agent, or Firm* — Clements Bernard Walker; Christopher L. Bernard (57) ABSTRACT

A method for mounting a battery system to a chassis floor of an electrical vehicle is provided, wherein the battery system is adapted for providing electrical power for driving rolling movement of said electrical vehicle, and wherein a plane extends through and parallel to said chassis floor with a first side of said plane facing in a downward direction during use of the electrical vehicle, the method including: fixing a plurality of battery modules to the chassis floor at the first side of said plane, each battery module including electrical terminals; subsequently electrically connecting the electrical terminals of the battery modules to each other to form the battery system; and fixing a cover plate to the chassis floor such that the cover plate covers the battery modules. A vehicle chassis and a vehicle including such a chassis are provided as well.

16 Claims, 6 Drawing Sheets

(51) Int. Cl.
*H01M 50/264* (2021.01)
*H01M 50/24* (2021.01)

(52) U.S. Cl.
CPC ..... *B60K 2001/0438* (2013.01); *H01M 50/24* (2021.01); *H01M 2220/20* (2013.01)

(56) References Cited

U.S. PATENT DOCUMENTS

| | | | |
|---|---|---|---|
| 2014/0027189 A1* | 1/2014 | Fujii | B60K 1/04 180/68.5 |
| 2016/0093863 A1* | 3/2016 | DeKeuster | H01M 50/553 429/121 |
| 2017/0001667 A1* | 1/2017 | Ashraf | B60K 1/00 |
| 2020/0075907 A1 | 3/2020 | Shimazaki et al. | |

* cited by examiner

METHOD FOR MOUNTING A BATTERY SYSTEM TO A CHASSIS OF AN ELECTRIC VEHICLE

CROSS-REFERENCE TO RELATED APPLICATION

The present disclosure claims the benefit of priority of co-pending European Patent Application No. 20212690.0, filed on Dec. 9, 2020, and entitled "Method for Mounting a Battery System to a Chassis of an Electric Vehicle," the contents of which are incorporated in full by reference herein.

TECHNICAL FIELD

The present disclosure relates to method for mounting a battery system to a chassis of an electric vehicle, such as a passenger car. The disclosure further relates to a chassis for an electrical vehicle, and to an electrical vehicle including such a chassis.

BACKGROUND

From the prior art a battery electric vehicle is known, the vehicle including a chassis supporting a body of the vehicle. The chassis includes a frame structure with a pair of side rails connected by a plurality of rigid cross-rails which define a plurality of bays. A battery pack including a battery housing in which a plurality of electrical energy storage devices is accommodated, can be attached directly to the plurality of cross-rails, with at least a portion of the battery housing in the bays, and with the plurality of cross-rails extending in corresponding channels of the battery housing. The battery pack can be mounted in the frame and may be replaced when necessary. However, a drawback of the known electric vehicle is that the battery pack and structures for mounting the battery pack to the vehicle make up a significant amount of the vehicle's total weight.

It is an object of the disclosure to provide a method for mounting a battery system to the chassis of a vehicle, and to provide a chassis and battery electric vehicle including such a chassis, in which this drawback is at least partially overcome.

SUMMARY

To this end, the present disclosure provides a method for mounting a battery system to a chassis floor of an electrical vehicle, the battery system being adapted for providing electrical power for driving rolling movement of said electrical vehicle, a plane extending through and parallel to said chassis floor with a first side of said plane facing in a downward direction during use of the electrical vehicle, the method including: individually fixing battery modules of a plurality of battery modules to the chassis floor at the first side of said plane, each battery module including electrical terminals; subsequently electrically connecting the electrical terminals of the battery modules to each other to form the battery system; and fixing a cover plate to the chassis floor such that the cover plate covers the battery modules. The battery system, when mounted, thus is enclosed by the chassis floor and the cover plate, without a further housing for the entire battery system being required, in this manner allowing the construction of a light-weight the battery system. In particular, no top plate of a battery housing is needed between the chassis floor and the battery system.

As according to the method, the battery modules have already been fixed to the chassis floor before the battery modules are electrically connected to form the battery system, no housing is needed to be able to transport the battery system to the chassis and mount the system to the chassis.

The battery modules can be placed close to, or even in direct contact with, the chassis floor. This may result in a reduced height of the battery system when compared to systems in which a top cover plate is present between battery system and the chassis floor. Because of the reduced height of the battery system, any reinforcement structure(s) of the vehicle for protecting the battery system can be of a reduced height as well, or may even be omitted, thus further reducing weight of the vehicle.

In an example, fixing each battery module of the plurality of battery module to the chassis floor includes moving the module towards the first side of the chassis floor in a direction substantially normal to said first side and subsequently fixing the module to the chassis floor.

In an example, battery modules, or at least the battery cells thereof, are spaced apart from the cover plate by a distance of at least 8 mm in the downward direction, e.g. wherein the distance is between 8 mm and 25 mm in said downward direction. In this manner it may be prevented that a thermal bridge is formed between the battery modules (or their cells) and the cover plate, and the influence of outside weather conditions on the working of the battery modules is reduced. The space between the battery modules and the cover plate, which is typically made from a metal, such as aluminium, or a metal alloy, may be is filled with a thermally insulating material, such as air or an air containing foam.

In an example the battery modules are fixed to the cover plate, e.g. by bolting the battery modules to the cover plate and/or by fixing the modules to the cover plate using an adhesive.

In an example, when the cover plate is fixed to the chassis floor and parallel to the horizontal, and when the vehicle is stationary, less than 50% of the total weight of the battery system is supported by the cover plate. The remaining weight of the battery system can be supported directly by the chassis floor.

In an example, the chassis floor, on a side thereof facing the interior of the vehicle, is provided with a floor upholstery. The floor upholstery typically includes a carpet, liner or soft material such as rubber, felt, vinyl and/or fabrics. Generally, parts of the floor upholstery, near where a vehicle's occupant places his or her feet, are covered with floor mats. The distance between the battery modules and the side of the chassis floor which faces the vehicle interior is may for instance be less than 10 mm.

In an example fixing the battery modules to the chassis floor includes fixing each battery module in such a manner that the electrical terminals of said battery module face in a direction opposite from the first side. This allows easy access to the electrical terminals prior to fixing the cover plate to the chassis floor.

In an example, each battery module includes multiple battery cells that are glued together, each individual battery cell including a corresponding individual casing. The casing for instance may have a prismatic or cylindrical shape. The casings of the battery cells may be exposed at a top side and/or bottom side of the battery module prior to fixing the battery module to the chassis floor, so that adhesive for attaching the cell to the chassis floor and/or to the cover plate, can be applied directly to the casing of each individual cell.

Alternatively, each battery module includes a single battery cell including a corresponding individual casing, and fixing the battery modules to the chassis floor includes individually fixing each battery cell to the chassis floor.

In either case, fixing the battery modules to the chassis floor typically includes fixing the battery modules to the chassis floor using an adhesive. Epoxy based adhesives have been found particularly suitable. The adhesive may space the battery cells apart from the chassis floor by less than 8 mm. That is, the battery cells may directly contact the chassis floor at their non-terminal side, e.g. in a manner that the cells partially extend through the adhesive.

In an example the electrical terminals of the battery cells are electrically connected to each other by means of ultrasonic welding or laser welding, e.g. in this manner the battery terminals to each other via conductive wires that are welded to the terminals. Batteries are prone to damage when subjected to high temperatures. Ultrasonic welding and laser welding allow electrically conducting conduits to be attached to the terminals while generating relatively little heat.

In an example, each battery module includes multiple battery cells surrounded by a casing. For instance, each battery module may include between 24 and 48 or more battery cells which are electrically connected to each other at the in, wherein the battery module has two or more electrical terminals. Typically, the individual battery cell terminals are completely surrounded by the casing, and only the electrical terminals of the entire module are accessible from the exterior of the casing. The multiple battery cells may be attached to each other using an adhesive. The casing should support the battery cells therein, but does not have to be able to withstand particularly strong forces thereon. Examples of suitable materials for the casing include plastics. The casing may include, or be made from, a material having a lower density than the material of the cover plate.

In an example, the electrical terminals of the battery modules are connected to each other by bolting electrical busbars to the terminals. Heating of the terminals can thus be avoided, as bolting does not require high temperatures.

In an example the casing of one or more of the battery modules is fixed to the chassis floor using bolts. The chassis floor may be provided at the first side with crossbeams for receiving the bolts.

In an example the battery modules, when fixed to the chassis floor, directly contact the chassis floor or are spaced apart from the chassis floor by no more than 8 mm, e.g. by no more than 5 mm, for instance by no more than 3 mm. This may result in a reduction in height of the battery system that would not be possible if a top cover plate were present between the chassis floor and the battery system.

In an example the method further includes providing the chassis floor with a reinforcement structure prior to fixing the battery modules to the chassis floor. The reinforcement structure may include beams and crossbeams which together define bays for accommodating one or more of the battery modules therein. The reinforcement structure, e.g. beams and cross beams thereof, may completely surround the sides of the plurality of battery modules, in this manner protecting the battery modules during a collision.

In an example, the chassis floor on its first side is provided with crossbeams.

In an example a lowest side of each of the battery modules is arranged above two distal edges of said reinforcement structure when the vehicle is on a horizontal surface. In case the vehicle travels over a bump or the like during which the cover plate contacts the ground, most of the impact may thus be transferred to the reinforcement structure, rather than directly to the battery modules. The reinforcement structure may be provided at the first side, so that when the battery system is installed and during use of the vehicle, no part of the battery system extends downwards beyond the two distal edges of the reinforcement structure. Typically, the distal edge will be formed by side rails or beams which extend in the longitudinal direction of the vehicle, wherein, when seen in top view, the battery system extends between said two side rails or beams.

In an example, the method includes fixing the battery modules to the cover plate. In case the battery modules have a casing surrounding multiple battery cells, this can be done for instance by providing crossbeams support structures at a downward facing side of the battery module, and bolting the casings to cover plate using bolts which extend through the crossbeam support structures. Alternatively, in particular when the battery modules are not surrounded by a common casing, the battery modules may be fixed to the cover plate using an adhesive.

In an example, when seen in cross-section through a plane parallel to the downward direction, each line parallel to said downward direction between the chassis floor and the cover plate intersects at most one of the battery modules. This allows battery modules to be arranged within 8 mm or less rom the chassis floor by moving the battery modules parallel to the downward direction and towards the chassis floor, e.g. over a distance of at least 10 cm, substantially without moving the battery module in a direction parallel to the plane. Thus, when the cover plate is removed from the chassis floor, the terminals of all battery modules of the battery system are accessible, in particular without having to remove any of the battery modules from the system to access another of the battery modules. Each battery module may have a height along said downward direction, which height is greater than half the distance between the chassis floor and the cover plate along the corresponding line which intersects the battery module.

According to a second aspect the present disclosure provides a chassis for an electrical vehicle, including: a chassis floor, wherein a plane extends through and parallel to said chassis floor, wherein a first side of said plane faces in a downward direction during use of the electrical vehicle; a battery system including a plurality of battery modules having terminals which are electrically connected to each other, wherein said battery system is adapted for providing electrical power for driving rolling movement of said electrical vehicle; a cover plate fixed to the chassis floor such that the cover plate covers the battery modules, wherein the battery modules are fixed to the chassis floor at the first side of the plane and wherein each battery module includes terminals which face towards the cover plate. The battery modules are fixed to the chassis floor, so that no top plate of a battery housing or the like is needed between the chassis floor and the battery system, in this manner saving weight. The terminals which face towards the lower side can easily be accessed when the cover plate is removed. Generally, each battery module is spaced apart from the cover plate.

In an example, when seen in cross-section through a plane parallel to the downward direction, each line parallel to said downward direction between the chassis floor and the cover plate intersects at most one of the battery modules. Thus, when the cover plate is removed from the chassis floor, the terminals of all battery modules of the battery system are accessible, in particular without having to remove any of the battery modules from the system to access another of the battery modules.

In an example each battery module includes multiple battery cells that are glued together, with each individual battery cell including a corresponding individual casing, or wherein each battery module includes multiple battery cells surrounded by a casing.

According to a third aspect the disclosure provides an electrical vehicle including a chassis according to the second aspect, the vehicle further including: at least four wheels arranged for contacting the ground; one or more electrical motors for driving rotation of said wheels; and a controller, connected to the one or more electrical motors and to the battery system, and adapted for controlling the amount of power that is provided from the battery system to said one or more electrical motors. Generally, the vehicle will be a passenger car which has only four wheels in contact with the ground.

BRIEF DESCRIPTION OF THE DRAWINGS

The present disclosure will be discussed in more detail below, with reference to the attached drawings, in which.

DETAILED DESCRIPTION

Figure 1:
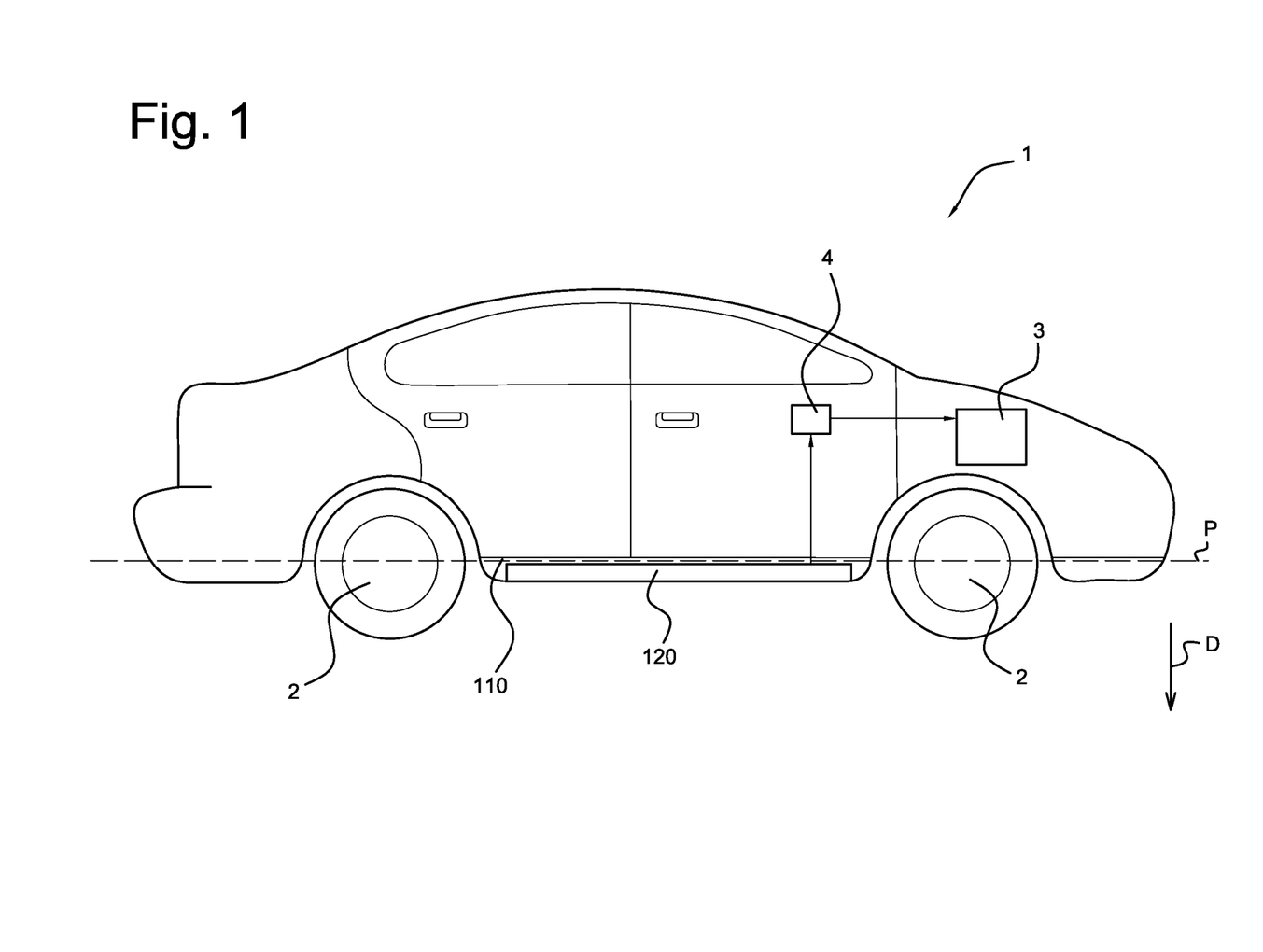
FIG. 1 schematically shows a sideview of an electric vehicle, to which a battery system has been mounted in accordance with the method of the disclosure.

FIG. 1 schematically shows an electric vehicle 1 according to the disclosure. The vehicle is provided with an electromotor 3 for driving rotation of wheels 2. A controller 4 is configured for controlling an amount of power that is provided from a battery system 120 to the electromotor 3. The battery system 120 is attached at a bottom side of the vehicle to a chassis floor 110 which generally faces in a downward direction D during use of the vehicle. In the example shown, the vehicle 1 is a passenger car with four wheels which contact the ground.

Figure 2A:
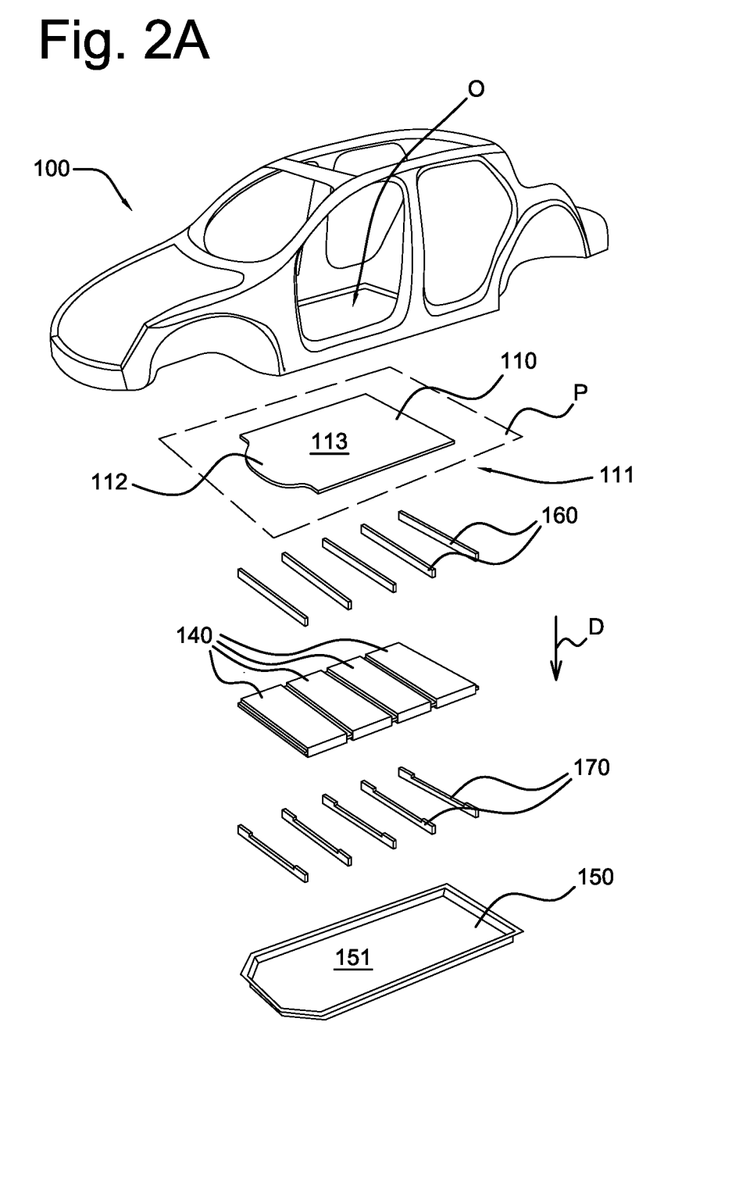
FIG. 2A shows a perspective exploded view of an embodiment of the disclosure, in which battery modules each with multiple battery cells are fixed to a chassis floor of a vehicle.

FIG. 2A shows a perspective exploded view of a vehicle chassis 100 according to a first embodiment of the disclosure. Though in the exploded view the chassis 100 has an opening O at its lower side, when the chassis is assembled, chassis floor 110 substantially closes off the opening O and provides a support for mounting vehicle seats and the like in the interior of the vehicle. A plane P extends through the chassis floor 110 and substantially parallel thereto. When assembled, a first side 111 of the plane P faces in a downward direction D. Side 112 of the chassis floor 110, which faces in an opposite direction towards the interior of the vehicle, is provided with floor upholstery 113 in the form of a fabric or a soft material, which typically can be directly contacted by occupants of the vehicle. When the chassis floor 110 forms part of the chassis 100, multiple battery modules 140 are fixed to a downward facing side of the chassis floor at the first side 111 of the plane P. The modules 140 are fixed to crossbeams 160 in such a manner that the modules remain spaced apart from each other. The crossbeams are fixed to the chassis floor and also increase the structural rigidity of the chassis floor 110. At a lower side the battery modules 140 contact rest on structures 170 in the form of further crossbeams which are fixed to a bottom plate 150 and further help to increase the structural rigidity of the battery system 120 that is formed once all battery modules 140 have been fixed to the chassis floor 110 and have been electrically connected to each other, as will be explained with reference to FIG. 2B. When the battery system 120 has been formed in this manner, the cover plate 150 is fixed to the chassis floor to cover the battery modules, causing the modules to be vertically sandwiched between the crossbeams 160 and the structures 170, and the modules are both supported from the crossbeams 160 and on the structures 170.

Figure 2B:
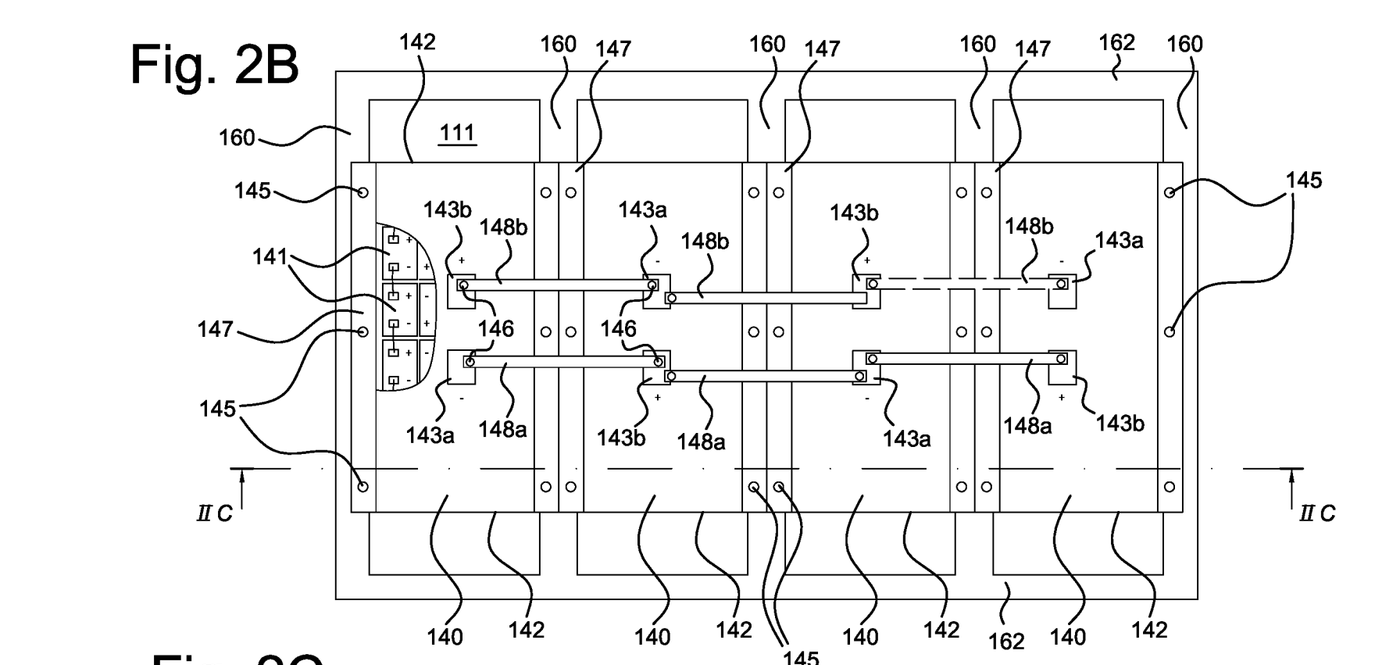
FIGS. 2B and 2C respectively show and a bottom view of the battery modules of FIG. 2A, and a sectional view through plane IIC-IIC of FIG. 2B.

FIG. 2B shows a bottom view of the battery modules 140 when these have not yet been fixed to reinforcement structures 170 and while the cover plate 150 has not yet been fixed to the chassis floor. Each battery module 140 includes a plurality of battery cells (shown only in the cut-away portion of the leftmost module 140 of FIG. 2B) and a casing 142 surrounding the cells. Each battery module 140 is individually mounted, via flanges 147 of its casing 142 to two crossbeams 160 of chassis floor 110 using bolts 145. The crossbeams 160 are at their distal ends connected to side rails 162, the crossbeams and side rails together forming a frame. At the lower side of each module, electrical terminals 143a,143b are accessible from the lower side of the chassis floor, allowing busbars 148a, 148b to electrically connect electrical terminals of different battery modules to each other, in this manner forming a battery system. In FIG. 2B, the battery system has not yet been completed, as all but one of the busbars have already been connected to the terminals by means of bolts 146, and the right uppermost busbar 148b shown in dotted lines is yet to be connected.

Figure 2C:
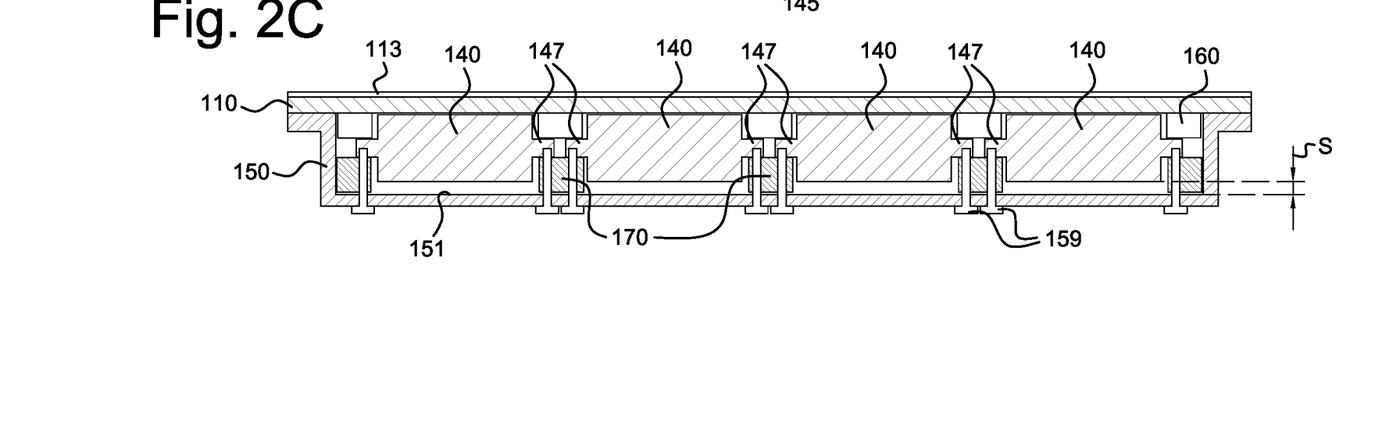

FIG. 2C shows a cross-section through plane IIC-IIC with the battery modules fixed to both the crossbeams 160 and the reinforcement structures 170, and with the cover plate 150 fixed to the chassis floor 110. The upper sides of the batter modules abut, or are arranged within 1 cm of, the first downward facing side of the chassis floor 110, and floor upholstery 113 in the form of a fabric or a soft material is provided on the oppositely facing upper side. As shown in FIG. 2C, once the cover plate 150 has been mounted to the chassis floor 110, each battery module 140 is also supported on the support structures 170, and may also be fixed thereto, e.g. using bolts (not shown), so that the modules are sandwiched between the crossbeams 160 and the support structures 170. The structures 170 are typically fixed to the cover plate 150 using bolts 159 which extend through the support structures 170 into the flanges 147 of the module casings 142 so that the modules in this manner are also fixed to the cover plate. However, the distal lower surface of each battery module 140 remains spaced apart by a distance S of between 5 and 10 cm from upward facing inner surface 151 of the cover plate 150. When the plate 150 hits a bump or the like the plate can thus deform somewhat without causing deformation of one or more of the battery modules, and additionally the busbars 148a,148b can extend in the space between the lower surfaces of the battery modules and the cover plate.

It is noted that according to the disclosure, the chassis floor may already be fixed to the vehicle chassis prior to mounting the battery system, or the battery system may be formed and mounted on the chassis floor while the chassis floor is spaced apart from the vehicle chassis, wherein once the battery system has been formed and fixed to the chassis floor, the chassis floor is mounted to the vehicle chassis.

Figure 3:
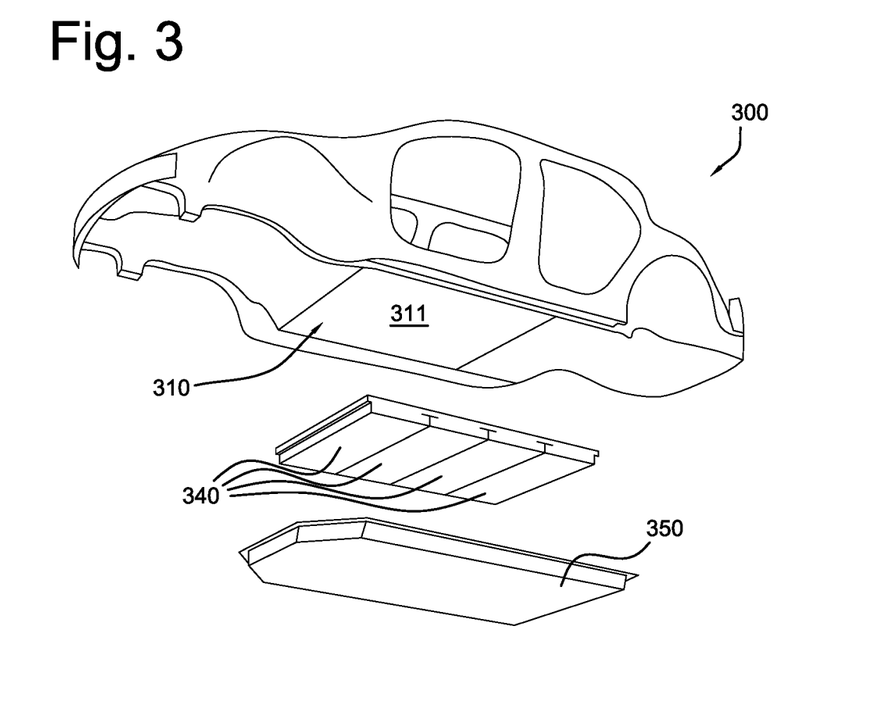
FIG. 3 shows an example of a vehicle chassis, battery modules and cover plate, as may be used according to the disclosure.

FIG. 3 shows an exploded view of an embodiment of the disclosure, in which the chassis floor 310 is formed as an integral part of the vehicle chassis 300. Battery modules 340, corresponding to the battery modules 140, are attached directly to the first, downward facing side 311 of the chassis floor, after which the cover plate is fixed to the chassis floor as well. Though not shown, support structures corresponding to the support structures 170 may be provided so that the modules are sandwiched between the chassis floor and the support structures.

Figure 4A:
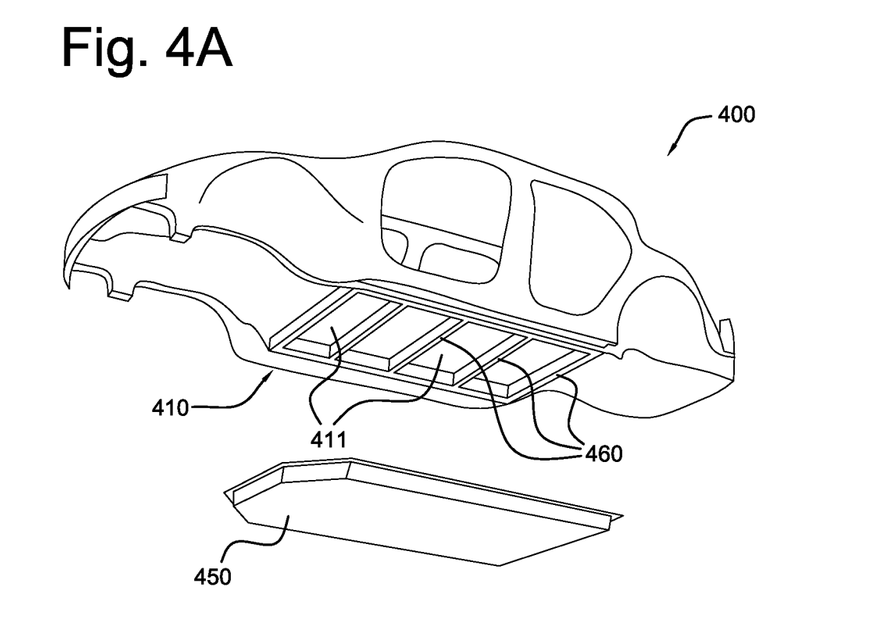
FIGS. 4A and 4B respectively show a perspective exploded view of another embodiment of the disclosure, in which battery modules, each formed by individual battery cells that are glued together, are fixed to a chassis floor of a vehicle, and a bottom view of the battery modules.

FIG. 4A shows a perspective view of a vehicle chassis 400 with a chassis floor 410 that is provided at its lower side with crossbeams 450 which define bays for receiving batteries therein. When cover plate 450 is fixed to the chassis floor each bay is enclosed by the downward facing first side 411 of the chassis floor 410, the crossbeams 460, and the cover plate 450.

Figure 4B:
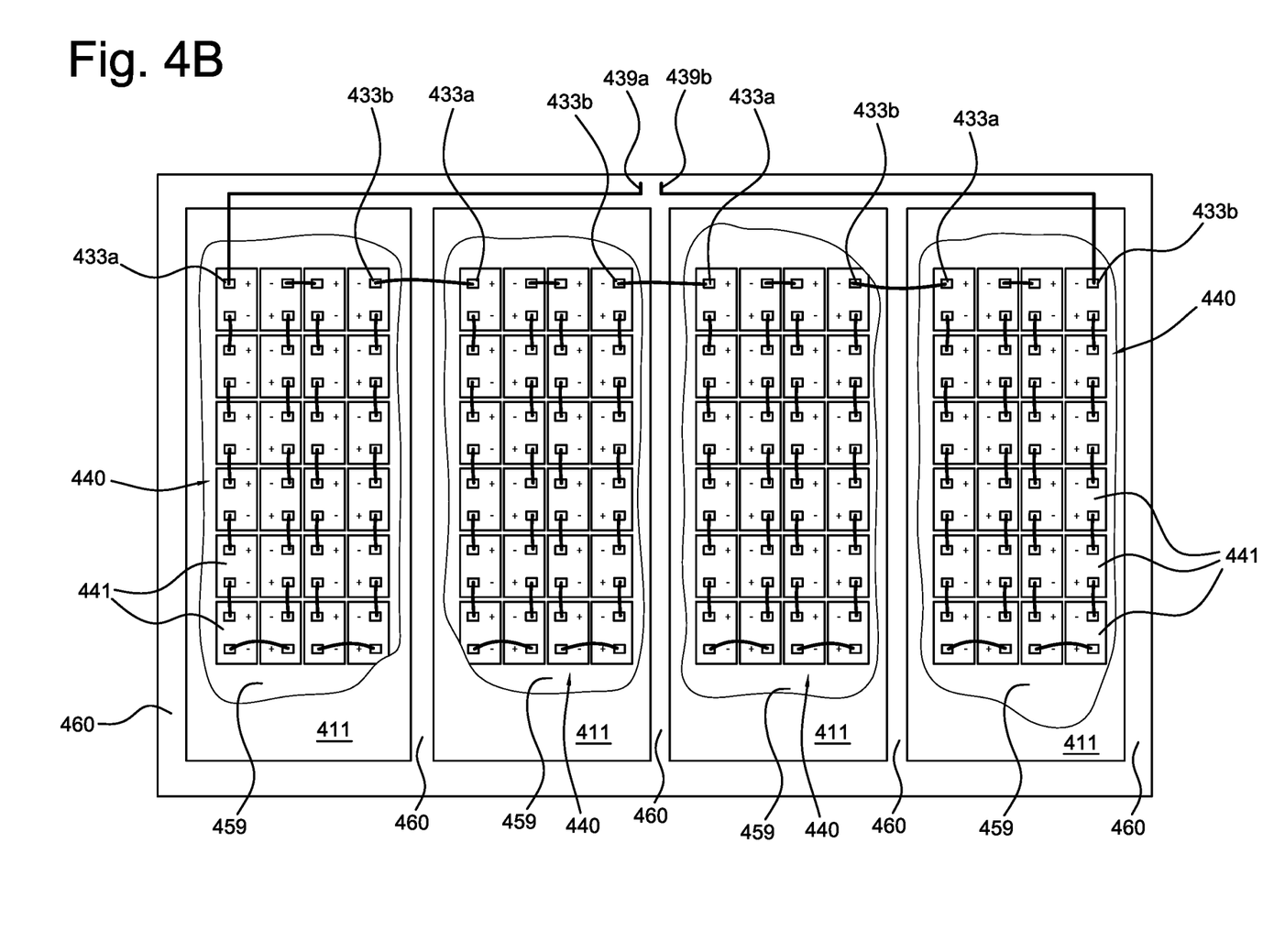

FIG. 4B shows a bottom view of the chassis floor 400 of FIG. 4A, wherein a battery system has been formed from multiply individual prismatic battery cells as follows:

First, multiple battery cells are glued together, e.g. using an epoxy glue to form battery modules 430 that can be individually mounted to the chassis floor. Each battery cell 431 includes an individual casing 432, and each module may be formed without a separate casing which surrounds all of its battery cells and provided substantial structural rigidity to the module. In the example shown, each module includes a total of 24 battery cells consisting of 6 rows of 4 cells each. The electrical terminals of the battery cells are connected to each other by conducting leads which are connected to the terminals. When the module is formed in this manner, all terminals of the battery cells, except for terminals 443a, 444b, may be connected to another terminal by means of a conducting lead. Next, the modules are placed in the bays and fixed by their upper sides to the downward facing first side 411 of the chassis floor using an adhesive 459 such as an epoxy glue.

Next, when all modules are fixed to the chassis floor in this manner, conductive leads are connected between the terminal 443a, 444b of different modules, to form the battery system. The battery system thus is completed only after the modules have been fixed to the chassis floor. The conductive leads between terminals of different modules are connected to each other by means of laser welding or ultrasonic welding, in order to prevent damage to the battery cells due to excessive heat as could occur e.g. is spot welding were used instead. In FIG. 4B, all modules have been electrically connected to each other to form a battery system, the battery system having external power leads 439a, 439b.

Figure 5:
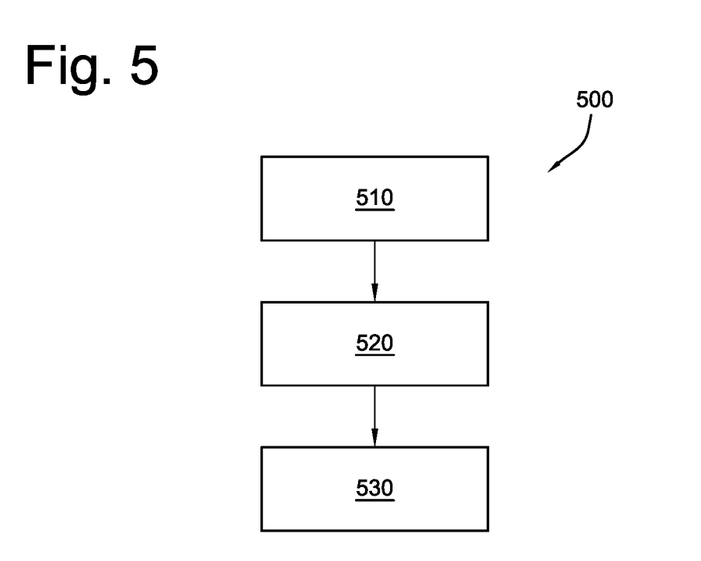
FIG. 5 shows a flow chart of the method of the disclosure.

FIG. 5 shows a flowchart of a method 500 in accordance with the present disclosure. The method includes individually fixing, 510, battery modules of a plurality of battery modules to the chassis floor at the first side of said plane. Next, the electrical terminals of the battery modules are connected to each other, 520, to form a battery system. Once the battery system has been formed in this manner, a cover plate is fixed to the chassis floor, 530, such that the cover plate covers the battery modules.

The present disclosure has been described above with reference to a number of exemplary embodiments as shown in the drawings. Modifications and alternative implementations of some parts or elements are possible, and are included in the scope of protection as defined in the appended claims.

The invention claimed is:

1. A method for mounting a battery system to a chassis floor of an electrical vehicle, the battery system being adapted for providing electrical power for driving rolling movement of said electrical vehicle, a plane (P) extending through and parallel to said chassis floor with a first side of said plane (P) facing in a downward direction (D) during use of the electrical vehicle, the method comprising:
   individually fixing battery modules of a plurality of battery modules to the chassis floor at the first side of said plane, each battery module comprising electrical terminals;
   subsequently electrically connecting the electrical terminals of the battery modules to each other to form the battery system; and
   subsequently fixing a cover plate to the chassis floor such that the cover plate covers the battery modules.

2. The method according to claim 1, the battery modules being spaced apart from the cover plate by a distance (S) of at least 8 mm in the downward direction.

3. The method according to claim 1, the chassis floor, on a side thereof facing the interior of the vehicle, being provided with a floor upholstery.

4. The method according to claim 1, said fixing the battery modules to the chassis floor comprising fixing each battery module in such a manner that the electrical terminals of said battery module face in a direction opposite from the first side.

5. The method according to claim 1, each battery module comprising multiple battery cells that are glued together, and each individual battery cell comprising a corresponding individual casing.

6. The method according to claim 5, wherein said fixing the battery modules to the chassis floor comprises fixing the battery modules to the chassis floor using an adhesive.

7. The method according to claim 5, said electrically connecting the electrical terminals of the battery modules to each other being carried out by means of ultrasonic welding or laser welding.

8. The method according to claim 1, each battery module comprising multiple battery cells surrounded by a casing.

9. The method according to claim 8, comprising fixing the casing of one or more of the battery modules to the chassis floor using bolts.

10. The method according to claim 1, further comprising fixing the battery modules to the cover plate.

11. The method according to claim 8, said electrically connecting the electrical terminals of the battery modules to each other being carried out by bolting electrical busbars to the terminals.

12. The method according to claim 1, wherein, when fixed to the chassis floor, the battery modules directly contact the chassis floor or are spaced apart from the chassis floor by no more than 8 mm.

13. A chassis for an electrical vehicle, the chassis comprising:
   a chassis floor, a plane (P) extending through and parallel to said chassis floor with a first side of said plane facing in a downward direction (D) during use of the electrical vehicle;
   a battery system comprising a plurality of battery modules having terminals which are electrically connected to each other, said battery system being adapted for providing electrical power for driving rolling movement of said electrical vehicle;
a cover plate fixed to the chassis floor such that the cover plate covers the battery modules; and
the battery modules being fixed to the chassis floor at the first side of the plane (P) and each battery module comprising terminals which face towards the cover plate.

14. The chassis according to claim 13, wherein each battery module is spaced apart from an upward facing interior surface of the cover plate.

15. The chassis according to claim 13, each battery module comprising multiple battery cells that are glued together, with each individual battery cell comprising a corresponding individual casing, or each battery module comprising multiple battery cells surrounded by a casing.

16. An electrical vehicle comprising the chassis according to claim 13, further comprising:
at least four wheels arranged for contacting the ground;
one or more electrical motors for driving rotation of said wheels; and
a controller, connected to the one or more electrical motors and to the battery system, and adapted for controlling the amount of power that is provided from the battery system to said one or more electrical motors.

* * * * *